United States Patent
Schwarz et al.

(10) Patent No.: US 11,448,123 B2
(45) Date of Patent: Sep. 20, 2022

(54) GEARED TURBOFAN ARCHITECTURE

(71) Applicant: United Technologies Corporation, Hartford, CT (US)

(72) Inventors: Frederick M. Schwarz, Glastonbury, CT (US); Daniel Bernard Kupratis, Wallingford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 564 days.

(21) Appl. No.: 14/734,035

(22) Filed: Jun. 9, 2015

(65) Prior Publication Data

US 2015/0361878 A1 Dec. 17, 2015

Related U.S. Application Data

(60) Provisional application No. 62/011,940, filed on Jun. 13, 2014.

(51) Int. Cl.
| | |
|---|---|
| *F02C 3/04* | (2006.01) |
| *F02K 3/075* | (2006.01) |
| *F01D 25/24* | (2006.01) |
| *F01D 25/16* | (2006.01) |
| *F01D 25/28* | (2006.01) |

(Continued)

(52) U.S. Cl.
CPC ............... *F02C 3/04* (2013.01); *F01D 9/023* (2013.01); *F01D 25/162* (2013.01); *F01D 25/24* (2013.01); *F01D 25/28* (2013.01); *F02K 3/06* (2013.01); *F02K 3/075* (2013.01); *F05D 2240/12* (2013.01); *F05D 2240/24* (2013.01); *Y02T 50/60* (2013.01)

(58) Field of Classification Search
CPC .... F02C 3/04; F02C 3/06; F02C 3/067; F02K 3/06; F02K 3/075; F01D 9/023; F01D 25/162; F01D 25/24; F01D 25/28; F05D 2240/12; F05D 2240/24
See application file for complete search history.

(56) References Cited

U.S. PATENT DOCUMENTS

| 2,154,532 A | 4/1939 | Ryder | |
|---|---|---|---|
| 4,896,499 A * | 1/1990 | Rice | F01D 5/185 60/39.182 |

(Continued)

FOREIGN PATENT DOCUMENTS

| EP | 2192276 | 6/2010 |
|---|---|---|
| EP | 2610460 | 3/2013 |

(Continued)

OTHER PUBLICATIONS

Waslh et al., Gas Turbine Performance (2004), Blackwell Publishing, 2nd edition, p. 273.*

(Continued)

*Primary Examiner* — Jason H Duger
(74) *Attorney, Agent, or Firm* — Carlson, Gaskey & Olds, P.C.

(57) ABSTRACT

A gas turbine engine includes a fan bypass ratio greater than 12. A speed reduction device includes a gear ratio of at least 2.6. A turbine section includes a transition duct that is located between a high pressure turbine and a low pressure turbine and includes fewer support struts than vanes in a first vane row of the low pressure turbine.

17 Claims, 3 Drawing Sheets

(51) Int. Cl.
F02K 3/06 (2006.01)
F01D 9/02 (2006.01)

(56) References Cited

U.S. PATENT DOCUMENTS

| | | | |
|---|---|---|---|
| 4,965,994 A | 10/1990 | Ciokajlo et al. | |
| 5,102,379 A | 4/1992 | Pagluica et al. | |
| 5,389,048 A | 2/1995 | Carlson | |
| 5,466,198 A | 11/1995 | McKibbin et al. | |
| 5,685,797 A | 11/1997 | Barnsby et al. | |
| 6,142,739 A * | 11/2000 | Harvey | F01D 5/20 415/173.1 |
| 6,148,605 A * | 11/2000 | Lardellier | F01D 1/30 415/123 |
| 6,223,616 B1 | 5/2001 | Sheridan | |
| 6,619,030 B1 * | 9/2003 | Seda | F01D 9/041 60/226.1 |
| 6,732,502 B2 * | 5/2004 | Seda | F01D 5/03 60/226.1 |
| 6,964,155 B2 | 11/2005 | McCune et al. | |
| 7,510,371 B2 * | 3/2009 | Orlando | F01D 5/141 415/191 |
| 7,685,808 B2 * | 3/2010 | Orlando | F02C 7/36 60/226.1 |
| 7,950,220 B2 * | 5/2011 | Merry | F02C 3/067 415/65 |
| 8,096,753 B2 | 1/2012 | Norris et al. | |
| 8,152,451 B2 * | 4/2012 | Manteiga | F01D 9/02 415/115 |
| 8,157,509 B2 * | 4/2012 | Black | F01D 25/30 415/126 |
| 8,191,352 B2 | 6/2012 | Schilling | |
| 8,257,024 B1 | 9/2012 | Phillips et al. | |
| 8,261,527 B1 | 9/2012 | Stearns et al. | |
| 8,262,345 B2 * | 9/2012 | Andrew | F01D 5/187 415/159 |
| 8,337,147 B2 * | 12/2012 | Staubach | F02K 3/06 415/122.1 |
| 8,622,694 B2 * | 1/2014 | Vontell | B23P 6/002 277/540 |
| 8,678,743 B1 | 3/2014 | Sheridan et al. | |
| 2010/0132369 A1 | 6/2010 | Durocher | F01D 9/065 60/796 |
| 2010/0135770 A1 | 6/2010 | Durocher et al. | |
| 2011/0206498 A1 | 8/2011 | McCooey | |
| 2011/0214433 A1 * | 9/2011 | Feindel | F01D 25/162 60/796 |
| 2012/0222397 A1 | 9/2012 | Smith et al. | |
| 2013/0078080 A1 * | 3/2013 | Durocher | F01D 11/04 415/110 |
| 2013/0192256 A1 * | 8/2013 | Suciu | F02K 3/072 60/796 |
| 2018/0016924 A1 * | 1/2018 | Gallier | F01D 9/041 |

FOREIGN PATENT DOCUMENTS

| | | |
|---|---|---|
| GB | 2218741 | 11/1989 |
| WO | 2010096087 | 8/2010 |
| WO | 2013115871 | 8/2013 |

OTHER PUBLICATIONS

Treager, Irwin, Aircraft Gas Turbine Engine Technology (1995), McGraw-Hill Education, 3$^{rd}$ Edition, Chapter 25, pp. 544-597.*

Mattingly, Aircraft Engine Design, 2002, American Insitute of Aeronautics and Astronautics, 2nd Edition, Chapters 3-5 and Appendix J (Year: 2002).*
Kurzke, "Fundamental Differences Between Conventional and Geared Turbofans" (2009), ASME, GT2009-59745 (Year: 2009).*
KNIP, Analysis of an Advanced Technology Subsonic Turbobfan Incorporating Revolutionary Materials (1987), NASA, TM-89868, 1-25 (Year: 1987).*
Ciepluch et al., "Quiet, Powered-Lift Propulsion," NASA Conference Publication 2077, Nov. 14-15, 1978 (429 pages)—Broken down to Report 1 through Report 8.
Jane's Aero-Engines, Edited by Bill Gunstron, Issue Seven, five pages.
Performance and Weight Estimates for an Advanced Open Rotor Engine, Eric S. Hendricks and Michael T. Tong, NASA/TM-2012-217710, AIAA-2012-3911, Sep. 2012.
Civil Turbojet/Turbofan Specifications http://www/jet-engine.net/civtfspec.html Last updated Apr. 3, 2005.
Extended European Search Report for Application No. 15171819.4 dated Nov. 11, 2015.
Summons to attend oral proceedings for European Application No. 15171819.4 (Patent No. 2955337) dated Feb. 25, 2022.
Opposition from Safran against European Application No. 15171819.4 (Patent N, 2955337) received Jun. 22, 2021—English Transaction.
D1—D. E. Gray et al., "Energy Efficient Engine Preliminary Design and Integration Studies" United Technologies Corporation, 1978 original electronic file: D1—NASA Gray CR-135396.pdf.
D10—Pratt & Whitney PW1000G Date posted Jan. 22, 2014. Publication Jane's Aero-Engines. original electronic file: D10—Pratt & Whitney PW1000G.pdf.
D12—Rosario Spataro et al., "On the flow evolution through a LP turbine with wide-chord vanes in an s-shaped channel", [cited Dec. 23, 2020] original electronic file: D12—GT2012-68178.pdf.
D2—The Geared Turbofan Technology—Opportunities, Challenges and Readiness Status original electronic file: D2—Riegler—The Geared_turbofan_technology.pdf.
D7_ K. Leach and R. Thulin, "Energy efficient engine—Turbine transition duct model technology report", [cited Jun. 6, 2019] original electronic file: D7—NASA Energy Efficient Engines TVF.pdf.
D9—C. Faustmann et al., "Experimental investigation of the noise generation and propagation for different turning mid turbine frame setups in a two-stage two-spool test turbine", [cited Dec. 23, 2020] original electronic file: D9—GT2013-95698.pdf.
Brief Communication—Safran for European Application No. 15171819.4 (Patent No. 2955337) dated Jul. 7, 2022. English Translation and French version. OB80467.
D13—Wendus. Follow-On Technology Requirement Study for Advanced Subsonic Transport Aug. 2003. NASA/CR-2003-212467. 58 pages.
D14-Wikipedia. Wayback Machine Mar. 2014—Pratt and Whitney PW1000G—Geared Turbofan. 5 pages.
D15-Bill Gunston. Jane's Aero-Engines Issue Seven Mar. 2000. 10 pages.
D16—Michel Dumas Expert statement Jun. 29, 2022. 14 pages. Foreign copy and English translation.
D17 Thaddeus W. Fowler. Jet Engines and Propulsion Systems For Engineers 1989. This is a large file that has been broken down into 6 parts. Total pages 516.
D18—The Aircraft Gas Turbine Engine And Its Operation—UTC. Reprinted with revisions Aug. 1988. 6 pages.
D19—Turboreactor Technology—ENAC 1989. 16 pages. Foreign copy and English translation.

* cited by examiner

GEARED TURBOFAN ARCHITECTURE

CROSS-REFERENCE TO RELATED APPLICATIONS

This application claims priority to U.S. Provisional Application No. 62/011,940, which was filed on Jun. 13, 2014 and is incorporated herein by reference.

BACKGROUND

This disclosure relates to a gas turbine engine, and more particularly to an improved turbine section and a method for improving the performance of the gas turbine engine.

A gas turbine engine may include a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. Among other variations, the compressor section can include low and high pressure compressors, and the turbine section can include low and high pressure turbines.

Typically, a high pressure turbine drives a high pressure compressor through an outer shaft to form a high spool, and a low pressure turbine drives a low pressure compressor through an inner shaft to form a low spool. The fan section may also be driven by the inner shaft. A direct drive gas turbine engine may include a fan section driven by the low spool such that a low pressure compressor, low pressure turbine, and fan section rotate at a common speed in a common direction.

A speed reduction device, which may be a fan drive gear system or other mechanism, may be utilized to drive the fan section such that the fan section may rotate at a speed different than the turbine section. This allows for an overall increase in propulsive efficiency of the engine. In such engine architectures, a shaft driven by one of the turbine sections provides an input to the speed reduction device that drives the fan section at a reduced speed such that both the turbine section and the fan section can rotate at closer to optimal speeds.

Although gas turbine engines utilizing speed change mechanisms are generally known to be capable of improved propulsive efficiency relative to conventional engines, gas turbine engine manufacturers continue to seek further improvements to engine performance including improvements to thermal, transfer and propulsive efficiencies.

SUMMARY

In one exemplary embodiment, a gas turbine engine includes a fan bypass ratio greater than 12. A speed reduction device includes a gear ratio of at least 2.6. A turbine section includes a transition duct that is located between a high pressure turbine and a low pressure turbine and includes fewer support struts than vanes in a first vane row of the low pressure turbine.

In a further embodiment of any of the above, an unshrouded turbine blade row is adjacent the transition duct.

In a further embodiment of any of the above, the unshrouded turbine blade row is adjacent the transition duct and is located in a high pressure turbine.

In a further embodiment of any of the above, there are at least four equally spaced support struts.

In a further embodiment of any of the above, a compressor section with a high pressure compressor has between 6 and 13 stages.

In a further embodiment of any of the above, the high pressure compressor includes at least 8 stages and a compression ratio of at least 16:1.

In a further embodiment of any of the above, the high pressure compressor includes at least 12 stages and a compression ratio of at least 22:1.

In a further embodiment of any of the above, the high pressure compressor includes at least 10 stages and a compression ratio of at least 29:1.

In a further embodiment of any of the above, the high pressure compressor includes at least 11 stages and a compression ratio of at least 35:1.

In a further embodiment of any of the above, the low pressure turbine is a drive turbine for a fan section.

In a further embodiment of any of the above, the fan bypass ratio is less than 20.

In a further embodiment of any of the above, the struts have an airfoil shape.

In a further embodiment of any of the above, the struts are free of cooling fluid passages.

In another exemplary embodiment, a method of improving performance of a gas turbine engine includes positioning a transition duct between a high pressure turbine and a low pressure turbine. The transition duct includes fewer support struts than vanes in a first row of the low pressure turbine. A temperature in the transition duct is decreased by increasing the number of stages in a high pressure compressor in a compressor section. The gas turbine engine includes a fan bypass ratio greater than 12 and a speed reduction device with a gear ratio of at least 2.6.

In a further embodiment of any of the above, the method includes decreasing the number of stages in a low pressure compressor when increasing the number of stages in the high pressure compressor to decrease a temperature in the transition duct.

In a further embodiment of any of the above, the method includes increasing a temperature in the transition duct by decreasing the number of stages in the high pressure compressor and increasing the number of stages in a low pressure compressor.

In a further embodiment of any of the above, the method includes rotating a low pressure compressor three times as fast as the fan.

In a further embodiment of any of the above, the method includes at least four equally spaced support struts.

In a further embodiment of any of the above, the high pressure compressor includes at least 8 stages with a compression ratio of at least 16:1 and is located immediately upstream of a combustor.

DETAILED DESCRIPTION

Figure 1:
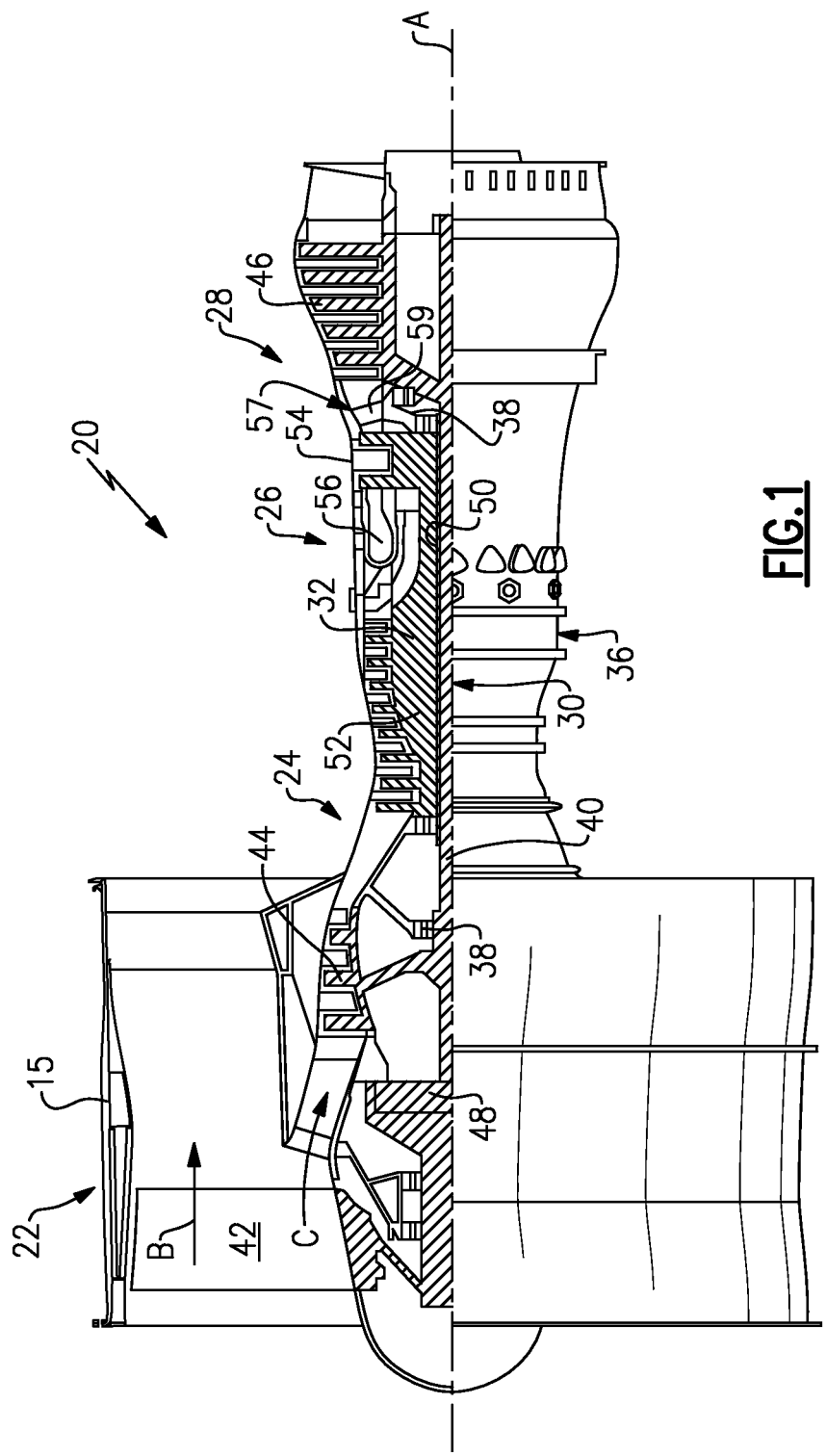
FIG. 1 illustrates a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool, two turbine turbofan gas turbine engine in the disclosed non-limiting embodiment, it should be understood that the concepts described herein are not limited to use with two-spool turbofans as the teachings may be applied to other types of turbine engines including three-spool, three turbine architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. In one exemplary embodiment, the geared architecture 48 includes a gear ratio of at least 2.6. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. In one example embodiment, the high pressure compressor 52 includes between 6 and 13 stages. In another example embodiment, the high pressure compressor 52 includes at least 8 stages with a compression ratio of 16:1. In yet another example embodiment, the high pressure compressor 52 includes at least 12 stages and a compression ratio of at least 22:1. In a further example embodiment, the high pressure compressor 52 includes at least 10 stages and a compression ratio of at least 29:1. In yet a further example embodiment, the high pressure compressor 52 includes at least 11 stages and a compression ratio of at least 35:1.

A mid-turbine frame 57 of the engine static structure 36 is arranged generally in front of the low pressure turbine 46. The mid-turbine frame 57 further may support bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 may include airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. In another embodiment, the engine 20 bypass ratio is greater than 12 and less than 20. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The majority of the engine's total thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
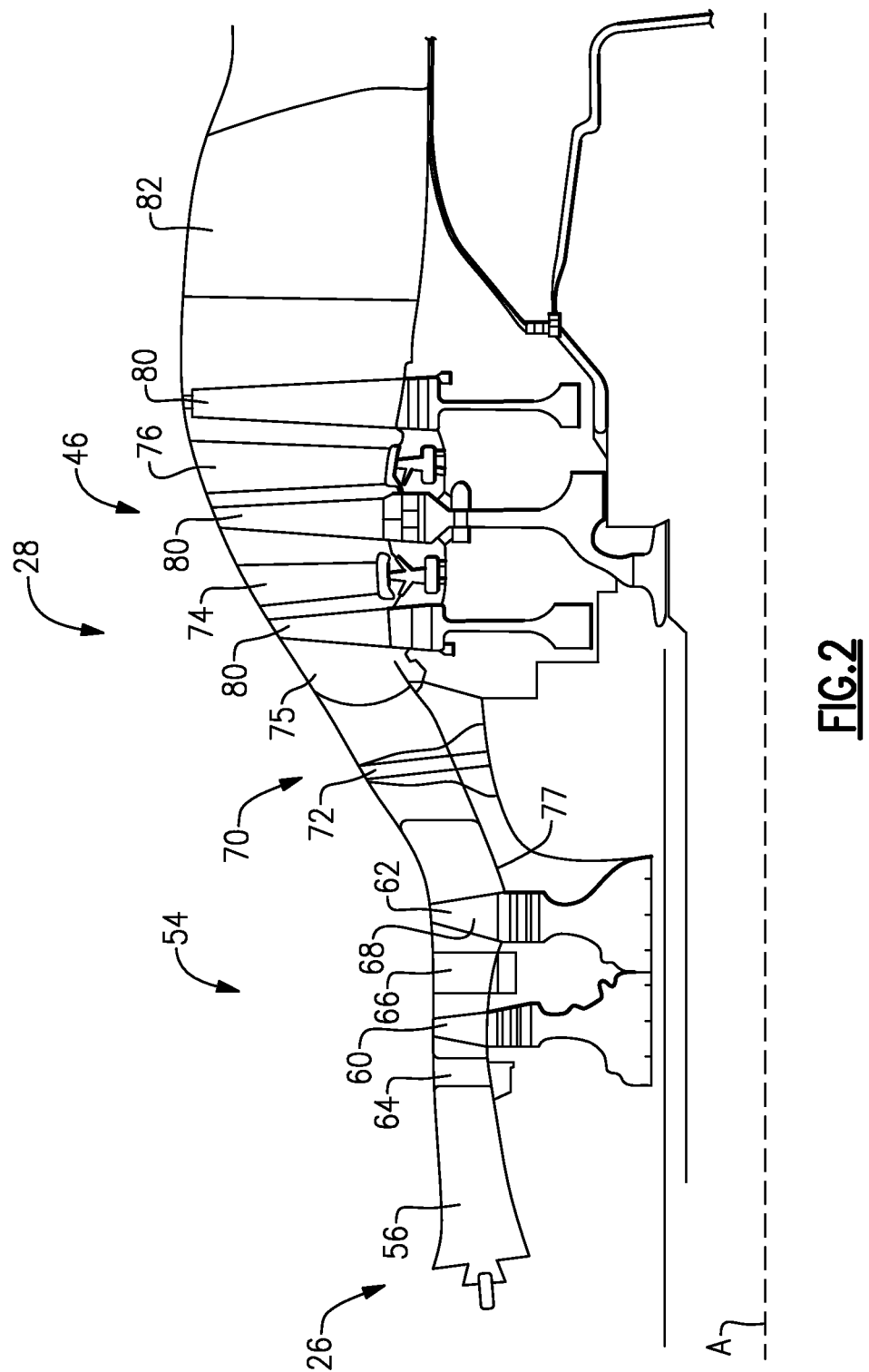
FIG. 2 illustrates an enlarged view of the gas turbine engine.

FIG. 2 shows an enlarged view of the combustor section 26 and the turbine section 28 of the gas turbine engine 20. In the illustrated non-limiting embodiment, the high pressure turbine 54 includes a first high turbine stage 60 and a second high turbine stage 62. An inlet high turbine vane set 64 is located immediately upstream of the first high turbine stage 60 and an intermediate turbine vane set 66 is located immediately downstream of the first high turbine stage 60 and immediately upstream of the second high turbine stage 62. The second high turbine stage 62 includes unshrouded rotors 68 without a downstream vane set.

A transition duct 70 is located immediately ahead of the low pressure turbine 46. The second turbine stage 62 exits directly into the transition duct 70 without a vane set as discussed above. The transition duct 70 includes at least four equally spaced support struts 72 about the flow path annulus that may be shaped as a turbine airfoil to perform the same function as entry vanes to the low pressure turbine 46. Each of the support struts 72 may include an airfoil shaped cross section to straighten the air as it leaves the high pressure turbine 54. The support struts 72 may be few in number and present a streamlined cross section leading to first low pressure turbine blades 80.

The low pressure turbine 46 includes a first row of low pressure turbine vanes 74 and a second row of low pressure turbine vanes 76 separating the at least three stages of the low pressure turbine blades 80. An exit vane 82 is located downstream of the low pressure turbine 46 adjacent an exhaust of the gas turbine engine 20.

Moreover, with the transition duct 70 positioned as illustrated, performance of the gas turbine engine 20 can be further improved by utilizing fewer support struts 72 than the first row low pressure turbine vanes 74. This is because the entire transition duct 70 including an outer wall 75, airfoil shaped struts 72, and an inner wall 77, tend to operate at temperatures bordering between a component that requires cooling and a component that does not require cooling.

The transition duct 70 is extremely large with the inner and outer platforms covering large areas. Also, the inner wall 77 and the outer wall 75 cannot be made of a full ring of material because of thermal interactions between the inner wall 77, the outer wall 75, and the struts 72 that traverse between the inner wall 77 and the outer wall 75. The thermal interactions cause warping or separation of the inner wall 77, the outer wall 75 and the struts 72. Therefore, in order to accommodate for the thermal expansion, the transition duct 70 must be segmented and generally include delicate sealing sheet metal strips between each of the segments.

Although this assembly technique is durable, segmenting the transition duct 70 leads to air leaks between the segments that can decrease the efficiency of the gas turbine engine 20. In order to reduce the number of segments and to reduce or even eliminate cooling the transition duct 70, consideration can be given to manipulating the gas path temperature. A temperature in the transition duct 70 is decreased by increasing the number of stages in the high pressure compressor 52 in the compressor section 24.

To maintain a generally constant overall compression ratio of the compressor section 24 when increasing the number of stages in the high pressure compressor 52, the number of stages in the low pressure compressor 44 will decrease, although perhaps not at a one-for-one ratio. Additionally, to maintain a generally constant overall compression ratio of the compressor section 24 when decreasing the number of stages in the high pressure compressor 52, the number of stages in the low pressure compressor 44 will increase. In general, the low pressure compressor 44 rotates three times as fast as the high pressure compressor 52.

The low pressure compressor 44 may be more efficient at compressing air than the high pressure compressor 52 because the source of the low pressure compressor work is the low pressure turbine 46 which is uncooled, operates at a very high speed, due to the geared architecture 48. The low pressure turbine 46 includes shrouded blades that reduce air leaking past the blade tips. Additionally, the geared architecture 48 allows the low pressure turbine 46 to rotate faster than the fan 42 which is limited in rotational speed due to fan tip aerodynamic losses of the fan blades.

Figure 3:
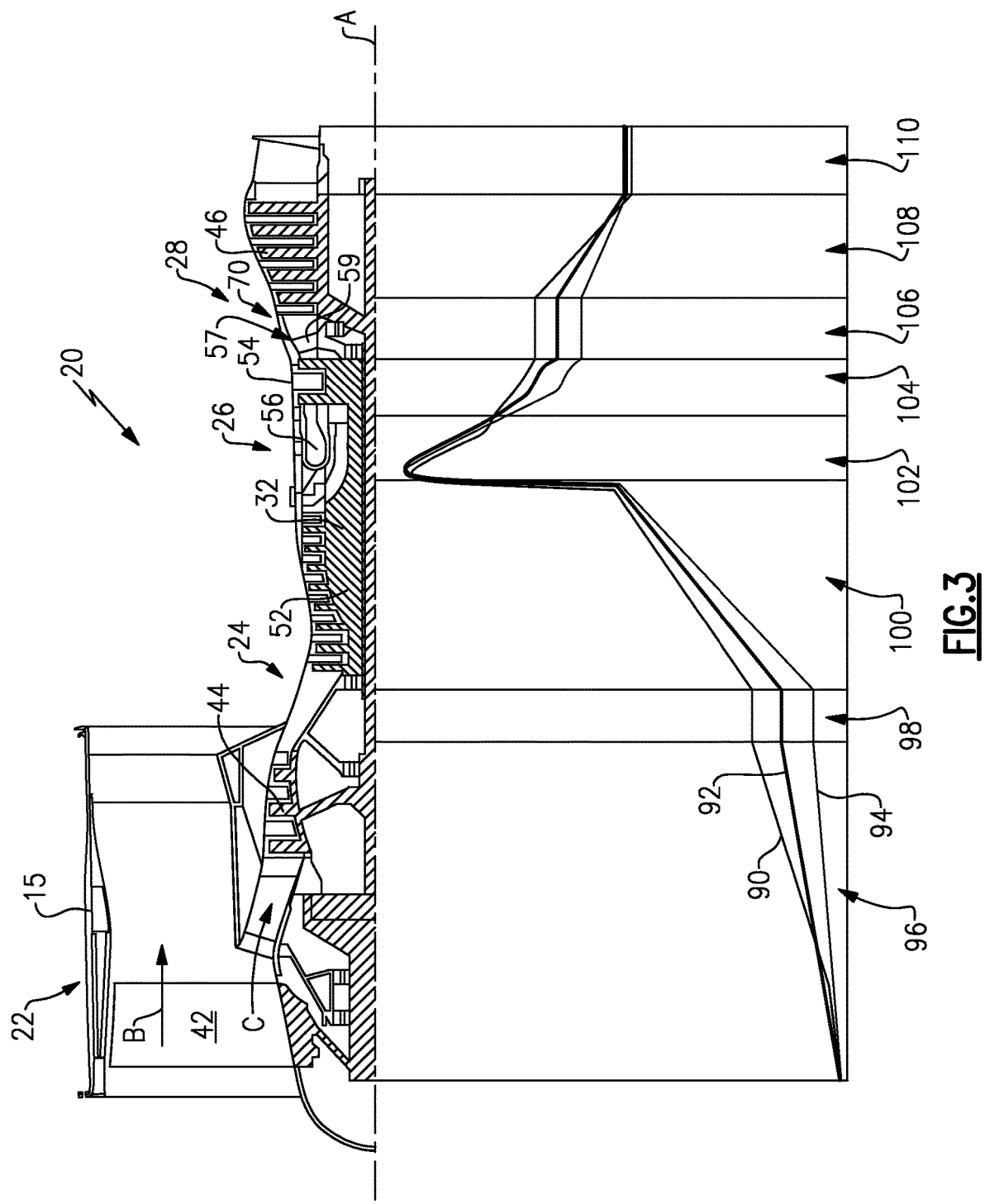
FIG. 3 illustrates the temperatures observed in the gas turbine while performing different amounts of high pressure compressor work and the associated transition duct temperatures.

FIG. 3 illustrates how the work load selection of the high pressure compressor 52 changes the temperature of the transition duct 70 as well as other sections of the gas turbine engine 20. The graph in FIG. 3 illustrates a temperature for various sections of a first configuration 90, a second configuration 92, and a third configuration 94 for the gas turbine engine 20 (each disclosed in greater detail, below).

A first section 96 of the graph corresponds to the fan 42 and the low pressure compressor 44 of the gas turbine engine 20. A second section 98 corresponds to a transition duct between the low pressure compressor 44 and the high pressure compressor 52. A third section 100 corresponds to the high pressure compressor 52. A fourth section 102 corresponds to the combustor section 26. A fifth section 104 corresponds to the high pressure turbine 54. A sixth section 106 corresponds to the transition duct 70. A seventh section 108 corresponds to the low pressure turbine 46. An eighth section 110 corresponding to an exhaust nozzle.

Each of the configurations 90, 92, and 94 of the gas turbine engine 20 produce exactly the same thrust and include exactly the same overall pressure ratio. The configurations 90, 92, and 94 of the gas turbine engine 20 will also have close to the same temperature exiting the combustor section 26, but there will be some variation due to the different overall efficiencies of the configurations 90, 92, and 94 for the gas turbine engine 20. A compression workload for the configurations 90, 92, and 94 varies in both the low pressure compressor 44 and the high pressure compressor 52. The configurations 90, 92, and 94 also have varying fuel consumption performance and temperatures of the transition duct 70.

For the first configuration 90 of the gas turbine engine 20, the pressure ratio of the high pressure compressor 52 is 14 and the rest of the work of the overall compressor section 24 is shifted to the low pressure compressor 44. Following the line corresponding to the first configuration 90 into the fifth section 104 in front of the low pressure turbine 46, the graph shows that the temperature exiting the combustor section 26 is the same in all the configurations 90, 92, and 94. However, relatively little work was done in the high pressure turbine 54 to extract temperature and pressure from the working fluid. This results in a relatively high temperature in the gas path traveling through the transition duct 70 in the sixth section 106. The elevated temperature will require more cooling and/or more segments in the transition duct 70. Additionally, it may be necessary to apply a ceramic coating on the transition duct 70 to increase durability of the transition duct 70.

For the third configuration 94 of the gas turbine engine 20, the pressure ratio of the high pressure compressor 52 is 36 and the work performed by the high pressure compressor 52 is very high. The gas entering the transition duct 70 is at a much lower temperature which allows for fewer segments in the transition duct 70. By reducing the number of segments in the transition duct 70, there will be little or no air leakage and the efficiency of the gas turbine engine 20 will increase. Additionally, the transition duct 70 will not require cooling and have improved performance from the reduced leakage between segments of the transition duct 70.

For the second configuration 92 of the gas turbine engine 20, the pressure ratio of the high pressure compressor 52 is 25. During operation, the third configuration 94 has not shifted as much work to the low pressure compressor 44 as the first configuration 90 or the second configuration 92. Therefore, although the transition duct 70 may experience lower temperatures and have a decreased number of segments in the third configuration 94, the overall performance of the third configuration 94 of the gas turbine engine 20 may be lower than the overall engine performance of the second configuration 92 of the gas turbine engine. This illustrates the balance in designing for advantageous temperatures in the transition duct 70 and the desire to derive more work from the low pressure turbine 46 in combination with the low pressure compressor 44.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A gas turbine engine comprising:
    a fan section having a fan bypass ratio greater than 12 and less than 20;
    a speed reduction device drivingly connected to the fan section;
    a compressor section with a high pressure compressor having between 8 and 13 stages and a pressure ratio of at least 16:1 and less than 35:1; and
    a turbine section including a transition duct located between a high pressure turbine and a low pressure turbine including fewer support struts than vanes in a first vane row of the low pressure turbine, wherein the first vane row of the low pressure turbine is located downstream of the transition duct and downstream of a first row of blades in the low pressure turbine, wherein the first row of blades in the low pressure turbine are immediately downstream of the support struts.

2. The gas turbine engine of claim 1, including an unshrouded turbine blade row adjacent the transition duct.

3. The gas turbine engine of claim 2, wherein the unshrouded turbine blade row adjacent the transition duct is located in the high pressure turbine.

4. The gas turbine engine of claim 1, wherein the fewer support struts include at least four equally spaced support struts.

5. The gas turbine engine of claim 1, wherein the high pressure compressor includes at least 12 stages and a pressure ratio of at least 22:1 and less than 35:1.

6. The gas turbine engine of claim 1, wherein the high pressure compressor includes at least 10 stages and a pressure ratio of at least 29:1 and less than 35:1.

7. The gas turbine engine of claim 1, wherein the low pressure turbine is a drive turbine for the fan section.

8. The gas turbine engine of claim 1, wherein the struts have an airfoil shape.

9. The gas turbine engine of claim 8, wherein the struts are free of cooling fluid passages.

10. A method of designing a gas turbine engine for improved performance comprising:
    positioning a transition duct between a high pressure turbine and a low pressure turbine, wherein the transition duct includes fewer support struts than vanes in a first vane row of the low pressure turbine and the first vane row of the low pressure turbine is located downstream of the transition duct and a first row of blades in the low pressure turbine are immediately downstream of the support struts;
    decreasing a design temperature in the transition duct by increasing a pressure ratio in a high pressure compressor in a compressor section and increasing extraction from a working fluid with the high pressure turbine; and
    wherein the gas turbine engine includes a fan section having a fan bypass ratio greater than 12 and less than 20 and a speed reduction device drivingly connected to the fan section.

11. The method as recited in claim 10, including decreasing a pressure ratio in a low pressure compressor when increasing the pressure ratio in the high pressure compressor to decrease the temperature in the transition duct.

12. The method as recited in claim 10, including rotating a low pressure compressor three times as fast as a fan.

13. The method as recited in claim 10, wherein the fewer support struts include at least four equally spaced support struts.

14. The method as recited in claim 10, wherein the high pressure compressor includes at least 8 stages, is located immediately upstream of a combustor, and includes the pressure ratio of at least 16:1 and less than 35:1.

15. The gas turbine engine of claim 1, wherein the vanes in the first vane row of the low pressure turbine are downstream of blades in the first blade row of the low pressure turbine.

16. The method of claim 10, wherein the vanes in the first vane row of the low pressure turbine are downstream of blades in the first blade row of the low pressure turbine.

17. The gas turbine engine of claim 10, wherein the first vane row of the low pressure turbine is located downstream of the transition duct and downstream of the first row of blades in the low pressure turbine.

* * * * *